United States Patent [19]

Smith et al.

[11] Patent Number: 4,777,349

[45] Date of Patent: Oct. 11, 1988

[54] ELECTRODE SENSOR APPARATUS AND METHOD OF OPERATING THE SAME

[75] Inventors: David M. Smith, Cowbridge; Andrew James, Pontypridal, both of Wales

[73] Assignee: Coal Industry (Patents) Limited, London, England

[21] Appl. No.: 801,907

[22] Filed: Nov. 26, 1985

[30] Foreign Application Priority Data

Jan. 25, 1985 [GB] United Kingdom ............... 8501973

[51] Int. Cl.[4] .............................................. H05B 1/02
[52] U.S. Cl. .................................... 219/494; 219/492; 219/490; 445/59
[58] Field of Search ................ 219/494, 492, 490–491, 219/497; 445/57, 59

[56] References Cited

FOREIGN PATENT DOCUMENTS

| 0253084 | 9/1926 | United Kingdom . |
| 0747681 | 4/1956 | United Kingdom . |
| 2008770 | 6/1979 | United Kingdom . |
| 1547935 | 7/1979 | United Kingdom . |

Primary Examiner—M. H. Paschall
Attorney, Agent, or Firm—James Creighton Wray

[57] ABSTRACT

In an instrument used to measure x-rays of the kind in which a wire anode operates in a gaseous atmosphere in a sealed housing to detect x-rays, the instrument is rejuvenated by passing a heating current through the anode to raise its temperature for a period of between two and six hours to convert any impurities to a compound.

5 Claims, 3 Drawing Sheets

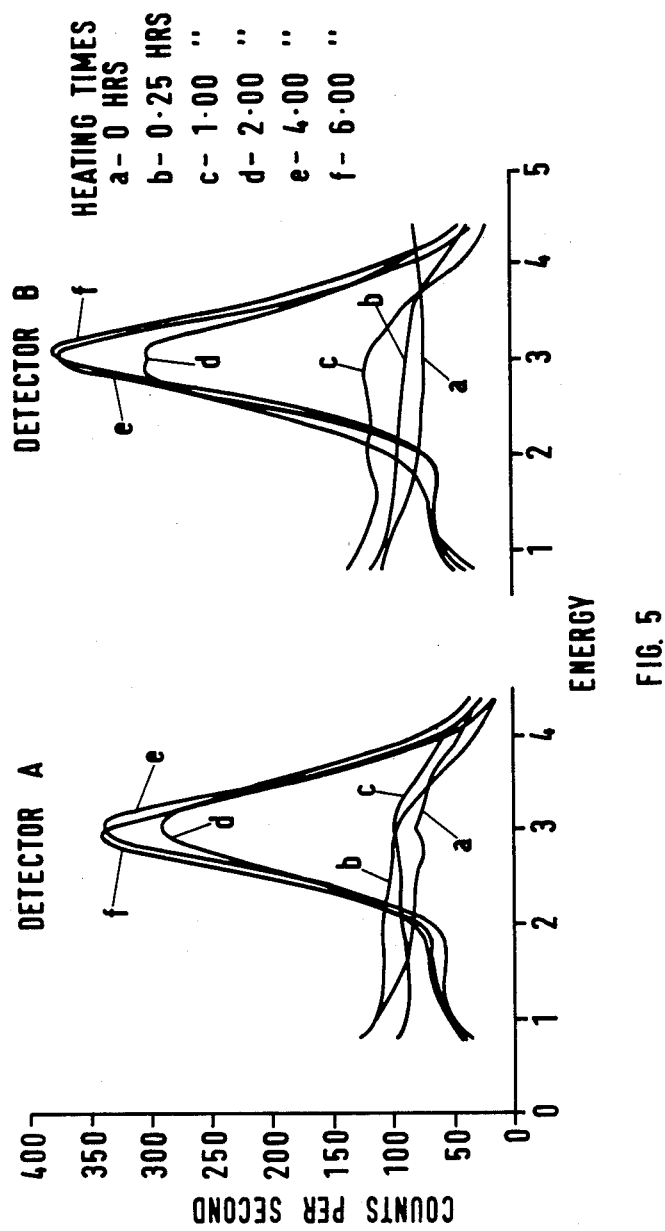

ELECTRODE SENSOR APPARATUS AND METHOD OF OPERATING THE SAME

BACKGROUND OF THE INVENTION

This invention relates to a method of treating an instrument having an electrode and particularly to an instrument where the electrode is of the wire type operating in a gaseous atmosphere.

The method is particularly, although not exclusively applicable to instruments of the kind used to operate as counters for scattered or direct radiation from x-ray or other radiation sources where the instrument is basically used as a counter for the rays received.

One particular type of application of such instrument is an x-ray instrument of the type which is employed in coal preparation plants to determine quickly and efficiently the ash content of coal being processed by the plants.

The instrument is used in conjunction with an x-ray source which beams x-rays at a sample of the coal passing through the plant and the backscatter from the surface of the coal is collected in the instrument and a pulsed output is produced which can be analysed to give an exact determination of the percentage of ash and other material in the coal.

This type of instrument is also used to determine the quantity of iron or sulphur in coal depending on the setting of the instrument.

The active element in one common form of instrument comprises tungsten anodes sealed in an aluminum housing having a window which is transparent to x-rays. The housing is filled with an atmosphere of an inert gas such as argon which may also include a small amount of quenching gas such as methane. High tension connectors are connected to these anodes and lead from the housing to a suitable analysing device.

The anodes detect particularly when there is an iron fluorescence peak of x-rays and the sharper that this peak is the more effective the counter. The peak is a result of the anodes reacting to the x-rays generating their own current.

It has been found that after a period of time the peak begins to diminish and the instrument therefore becomes less effective and accurate. Furthermore, the response not only over the energy range of the iron peak but over the whole of the range of the instrument falls off and this may be due to the element becoming sullied. It is then necessary for the active element of the counter to be replaced and this can be an expensive operation.

SUMMARY OF THE INVENTION

It is an object of the present invention to provide a means whereby the instrument can be rejuvenated by treating it in a way which does not need it to be physically broken into to destroy the gas atmosphere and which enables the treatment to be effected efficiently and quickly so that there is the minimum of down time.

According to the present invention, a method of treating an instrument having an electrode operating in a gaseous atmosphere of the kind in which the operation of the instrument is impaired by the presence of impurities includes the step of passing an electrical current through the electrode to raise the temperature of the electrode above its normal operating temperatures to convert any impurities on or adjacent the electrode to a compound and holding the electrode at the elevated temperature for a predetermined period.

The electrode is preferably heated until it is red hot and may be kept at this temperature for a period of at least two hours. The period may be varied from two hours.

In order that the invention may be readily understood, one description of its application will now be made with reference to the accompanying drawings.

BRIEF DESCRIPTION OF THE DRAWINGS

FIG. 5 shows the different response times of two detectors which have been treated in accordance with the invention for varying periods.

DETAILED DESCRIPTION OF THE DRAWINGS

In use the instrument forms part of a process control at a coal preparation plant. It is used to monitor the ash contents of coal passing through the plant by measuring and responding to the x-ray scatter from the material. It particularly measures the backscattered x-rays and this is used as a measure of the ash content. The degree of backscatter at the various energy levels varies with the ash content and with a good detector operating normally a typical response curve is as shown in FIG. 1.

It will be seen that at the energy level 3 there is a high peak of 120 counts per second which corresponds to the iron content.

Figure 2:
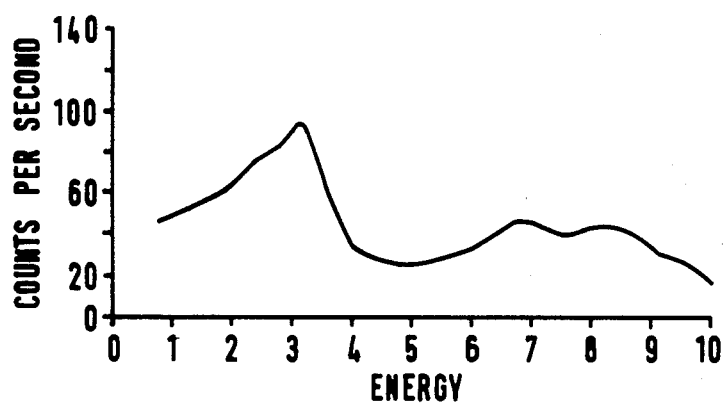

During its life the detector response starts to fall off in its efficiency and FIG. 2 shows the resolution of a detector which is beginning to fail. It will be noted that at the energy level 3 the response in counts per second has fallen to under 100 and there has been a diminished response at the higher energy levels.

Figure 1:
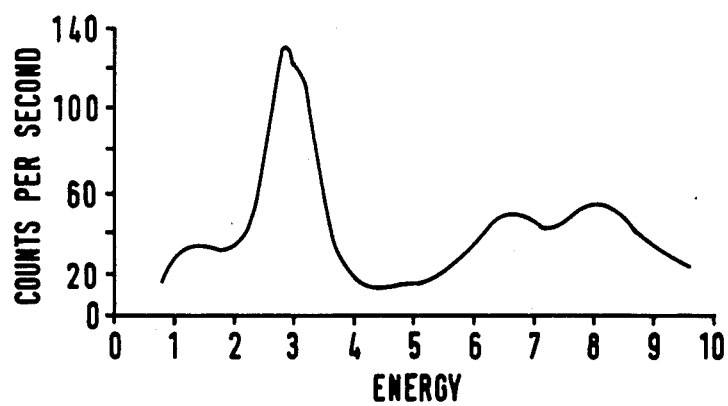
FIGS. 1, 2 and 3 indicate energy response curves respectively for a good detector, a detector which is failing and has poor resolution, and a detector which has effectively ceased to function and only has a low response.
Figure 3:
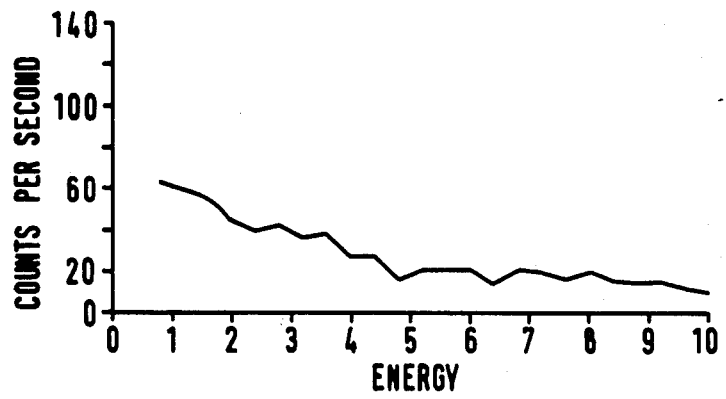

When the detector has become inoperative, the response curve is similar to that which is shown in FIG. 3 and it will be appreciated that by comparing this Figure with FIG. 1 the information obtained from the failed detector is useless and misleading.

It has been concluded that the reason for the failure of response is due to a poisoning in some way of the detector and this may either be due to the formation of deposits on the active anode wires of the unit or by a dilution or change in the constitution of the gaseous atmosphere which surrounds the anodes.

Figure 4:
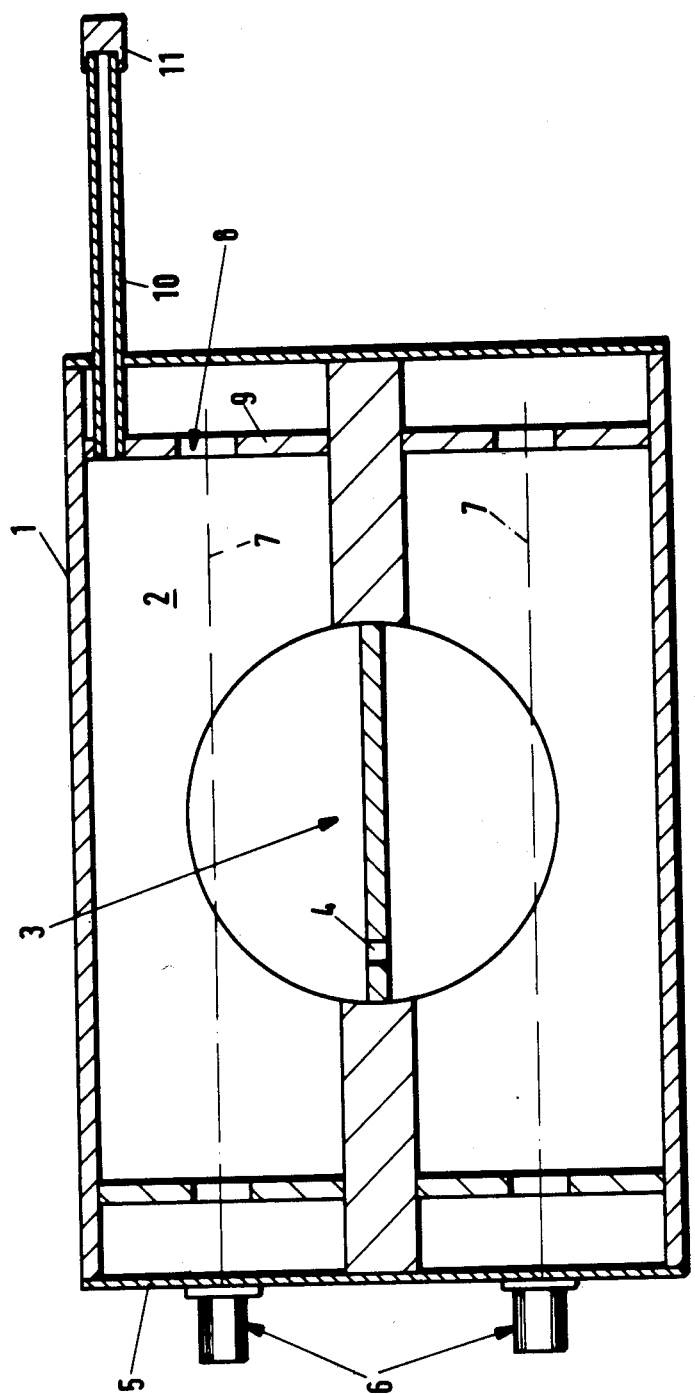
FIG. 4 is a schematic sectional view of a counter.

One particular construction of a detector unit is shown in FIG. 4 to which reference is now made. This Figure shows in schematic form the central elements of the detector. Basically, these comprise an aluminium housing 1, which has a window in it through which radiation backscattered from the sample can pass. This window is not shown in the drawing but is made of a material such as Beryllium which is transparent to x-rays but is able to contain a gas, in this case argon, which is contained in the area 2 within the housing 1. The argon has a content of methane which acts as a quenching gas.

The housing 1 is divided into two chambers by a divider plate 3, which is again shown in FIG. 4, and it will be seen that there are passages such as 4 which allow the gas to pass between the two chambers. In one of the end walls 5, of the housing 2 a pair of electrical high tension connectors 6 are set and these are connected to tungsten anodes 7 in the form of wires which extend to insulators 8 in the opposite wall 9 of the housing. This wall 9 also has a filler tube 10 passing through it and extending beyond the wall. The filler tube is used for introducing the argon gas into the chamber during manufacture and the filler tube is sealed after the gas is introduced as shown at 11.

When a detector is showing that its response is failing it is able to be removed from operation and rejuvenated by treating it in accordance with the present invention.

To do this a current of approximately 400 milliamps is passed through each of the wires 7 at a dc potential of approximately 30 volts. This causes the anodes 7 to increase their temperature until they achieve a state which is approximately equivalent to a red hot glow.

This wall 9 also has a filler tube 10 passing through it and extending beyond the wall. The filer tube is used for introducing the argon gas into the chamber during manufacture and the filler tube is sealed after the gas is introduced as shown at 11.

When a detector is showing that its response is failing it is able to be removed from operation and rejuvenated by treating it in accordance with the present invention. To do this a current of approximately 400 milliamps is passed through each of the wires 7 at a dc potential of approximately 30 volts. This causes the anodes 7 to increase their temperature until they achieve a state which is approximately equivalent to a red hot glow.

If reference is now made to the two sets of curves shown in FIG. 5 the effect of heating for different periods will be appreciated.

In FIG. 5, two families of curves are shown for two detectors, one labelled A and one labelled B. The heating times for the various curves a to f are shown beside the curves. It will be seen that for both detectors the effect of heating for a period of up to one hour, as shown by curves a, b and c is negligible and that no real improvement occurs until heating has been effected for at least two hours. The curve d indicates a substantial change in response and clearly a period of the order of two hours in a minimum which has to be applied for heating to have any substantial improvement.

The extension of the heating for a further two hours as shown in curves e again gives a substantial improvement whereas further heating as shown by curve f extending the time up to six hours give no great significant change in the improvement. Thus, the ideal time for heating this particular type of detector lies between two and six hours. The exact effect of heating is not known.

It may be that impurities which have formed on the wires are burnt off or it may be that there has been an impurity in the gas where for example oxygen has leaked in and the effect is to burn up the oxygen. Notwithstanding the imperfection of the knowledge of the operation, the effect of the treatment is such as to enable the detectors to be rejuvenated satisfactorily and tests show that these rejuvenated detectors operate for a long period correctly with the same effect as new detectors.

This enables the whole cost of operation of ash monitoring to be made more efficient and cost effective.

Although the invention has been described with reference to an x-ray instrument for monitoring ash content, it can clearly be applied to any similar instrument which operates on the same principle.

The feature of the invention is treating the detector by heating the anodes when the resolution of the instrument begins to deteriorate.

We claim:

1. A method of treating an instrument having an electrode operating in a gaseous atmosphere in a sealed housing, the instrument of the kind in which the operation of the instrument is impaired by the presence of impurities, including the step of passing an electrical current through the electrode to raise the temperature of the electrode above its normal operating temperature to convert any impurities in or adjacent the electrode to a compound and holding the electrode at the elevated temperature for a predetermined period to reduce the conversion to a steady state.

2. A method of treatment as claimed in claim 1, wherein the electrode is heated until it is red hot for a given period of time.

3. A method of treatment as claimed in claim 1, wherein the electrode is heated for at least two hours.

4. A method of treatment as claimed in claim 1, wherein the electrode is heated for about four hours.

5. A method of treatment as claimed in claim 1, wherein the electrode is heated for between two to six hours.

* * * * *